US006019340A

United States Patent [19]

Hanaoka

[11] Patent Number: 6,019,340

[45] Date of Patent: Feb. 1, 2000

[54] HOLDING APPARATUS OF AN ANTENNA APPARATUS

[75] Inventor: Shunsuke Hanaoka, Tokyo, Japan

[73] Assignee: Sony Corporation, Tokyo, Japan

[21] Appl. No.: 08/826,519

[22] Filed: Apr. 3, 1997

[30] Foreign Application Priority Data

Apr. 8, 1996 [JP] Japan .................................... 8-085345

[51] Int. Cl.[7] ..................................................... F16M 13/00

[52] U.S. Cl. .......................... 248/515; 248/514; 248/519; 343/882

[58] Field of Search .................. 248/511–515, 519–521; 343/878, 882, 805, 808; D14/235

[56] References Cited

U.S. PATENT DOCUMENTS

| | | | |
|---|---|---|---|
| 2,521,798 | 9/1950 | Leonard | 343/805 |
| 3,045,240 | 7/1962 | Raynor | 343/805 |
| 3,212,740 | 10/1965 | Greenberg | 248/514 |
| 4,243,989 | 1/1981 | Piper | 343/715 |
| 4,893,130 | 1/1990 | Metivier | 343/715 |
| 5,402,135 | 3/1995 | DeMarre et al. | 343/715 |
| 5,661,497 | 8/1997 | Calearo | 343/715 |

FOREIGN PATENT DOCUMENTS

| | | |
|---|---|---|
| 2844106 | 4/1980 | Germany . |
| 9428593 | 12/1994 | WIPO . |

*Primary Examiner*—Ramon O. Ramirez
*Assistant Examiner*—Gwendolyn Baxter
*Attorney, Agent, or Firm*—Jay H. Maioli

[57] ABSTRACT

A holding apparatus for use with an antenna apparatus which includes a pair of rod antennas (1*a*, 1*b*), a holding member (2) for holding the pair of rod antennas (1*a*, 1*b*), and a mounting shaft (4) projecting from the holding member (2) in a direction opposite to which the pair of rod antennas (1*a*, 1*b*) are provided, wherein the holding apparatus is composed of a top cover (10) having opening portions (11*a*, 11*b*) through which the pair of rod antennas (1*a*, 1*b*) can pass and clipping portions (12*a*, 12*b*, 13*a*, 13*b*) for clipping the holding member (2) of the antenna apparatus, and a stand base (20) having a mounting hole (21) into which the mounting shaft (4) of the antenna apparatus can rotatably fit.

10 Claims, 8 Drawing Sheets

HOLDING APPARATUS OF AN ANTENNA APPARATUS

BACKGROUND

1. Field of the Invention

The present invention relates to a holding apparatus of an antenna apparatus. More particularly, the present invention relates to a holding apparatus which makes it possible to utilize an indoor type television antenna apparatus, which is utilized by being directly mounted on a television receiver, as an on-the-table television antenna apparatus when the holding apparatus holds the indoor type television antenna apparatus.

2. Background of the Invention

As an indoor type television antenna apparatus which is utilized by being directly mounted on a television receiver, an antenna apparatus as shown in FIG. 1 has generally been utilized.

Specifically, the indoor type television antenna apparatus shown in FIG. 1, which is utilized by being directly mounted on the television receiver, includes a substantially parallelepiped holding member 2 formed of a synthetic resin and a pair of rod antennas 1*a*, 1*b* with a predetermined length and capable of being extended and contracted. The pair of rod antennas 1*a*, 1*b* are rotatably engaged at respective one ends with the holding member 2 by screws 3 so as to form any angle between the antennas extending in the left and right directions relative to each other.

The holding member 2 has a mounting shaft 4 of a predetermined length projecting from the holding member 2 in a direction inverse to the side on which the pair of rod antennas 1*a*, 1*b* are provided. This mounting shaft 4 is formed into a substantial cylindrical shape having a slit 4*a* of a predetermined length cut from the free end side of the mounting shaft 4. The mounting shaft 4 also has an expanding portion 4*b* formed along an outer periphery of the free end portion thereof.

In FIG. 1, reference numeral 5 depicts a feeder line of which one end is connected to the pair of rod antennas 1*a*and 1*b* . The other end of the feeder line 5 is connected to a predetermined terminal of a television receiver 6 which will be described later on.

FIG. 2 shows the television receiver 6 on which the indoor type television antenna apparatus shown in FIG. 1 can be mounted. The television receiver 6 has at its predetermined portion, i.e., an upper portion of a rear portion thereof in the present example, an antenna mounting portion 7 which is integrally formed with a rear cabinet of the television receiver which is formed of a synthetic resin.

The antenna mounting portion 7 is formed to have a mounting hole 7*a* of a predetermined length and a predetermined diameter so that the mounting shaft 4 can be fitted thereto.

If the indoor type television antenna apparatus, as shown in FIG. 1, is mounted on the television receiver 6, as shown in FIG. 3, the mounting shaft 4 of the indoor type television antenna apparatus is inserted at its free end side into the antenna mounting hole 7*a* of the antenna mounting portion 7 to be fitted thereto. In this case, the slit 4*a* formed in the free end portion of the mounting shaft 4 enables the mounting shaft 4 to be inserted and fitted into the mounting hole 7*a* with ease.

In this case, the expanding portion 4*b* formed at the free end of the mounting shaft 4 serves as a stopper, which prevents the mounting shaft 4 from being easily disengaged from the antenna mounting hole 7*a*. Further, since the mounting shaft 4 is formed into a cylindrical shape, the indoor type television antenna apparatus can rotate with ease relative to the television receiver 6 in the direction shown by an arrow X of FIG. 3. Therefore, the pair of rod antennas 1*a*, 1*b* can be adjusted in their orientation and position with ease.

The indoor type television apparatus shown in FIG. 1 is arranged to stand by fitting its mounting shaft 4 into the antenna mounting hole 7*a* of the antenna mounting portion 7 provided on the television receiver 6. Therefore, this indoor type television antenna apparatus cannot stand by itself. For this reason, the indoor type television antenna apparatus cannot be placed seperate from the television receiver 6 and standing by itself.

Further, the indoor type television antenna apparatus cannot be mounted on a television receiver having no antenna mounting hole 7*a*.

OBJECTS AND SUMMARY OF THE INVENTION

Therefore, it is a general object of the present invention to provide an improved holding apparatus of an antenna apparatus in which the aforesaid shortcomings and disadvantages encountered with the prior art can be eliminated.

More specifically, it is an object of the present invention to provide a holding apparatus of an antenna apparatus which makes it possible to utilize an indoor type television antenna apparatus as an on-the-table type antenna apparatus with a simple arrangement.

It is still another object of the present invention to provide a holding apparatus of an antenna apparatus which can provide an excellent appearance on the antenna apparatus when the antenna apparatus is utilized as an on-the-table antenna apparatus.

According to the present invention, there is provided a holding apparatus for use with an antenna apparatus which includes a pair of rod antennas, a holding member for holding the pair of rod antennas, and a mounting shaft projecting from the holding member in a direction opposite to the side on which the pair of rod antennas are provided, wherein said holding apparatus includes a top cover having an opening portion through which the pair of rod antennas pass and a clipping portion for clipping the holding member, and a stand base having a mounting hole to which the mounting shaft of the antenna apparatus can rotatably fit.

According to the holding apparatus of the antenna apparatus of the present invention, the antenna apparatus can be utilized as an on-the-table antenna apparatus by fitting the mounting shaft of the antenna apparatus into the mounting hole of the stand base.

According to the holding apparatus of the antenna apparatus of the present invention, when the antenna apparatus is held by the holding apparatus, the antenna apparatus is covered at its holding member with the top cover of the holding apparatus. Therefore, the antenna apparatus becomes an on-the-table antenna apparatus presenting an excellent appearance.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DESCRIPTION OF THE PREFERRED EMBODIMENT

An embodiment of a holding apparatus of an antenna apparatus according to the present invention will hereinafter be described with reference to the accompanying drawings.

Figure 1:
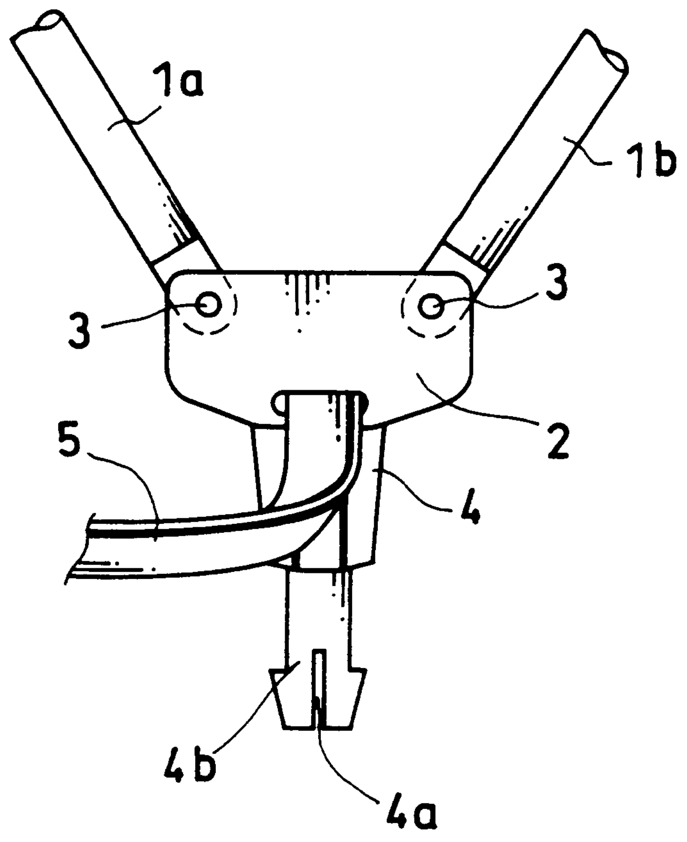
FIG. 1 is a partial rear view of an example of an indoor type television antenna apparatus.
Figure 2:
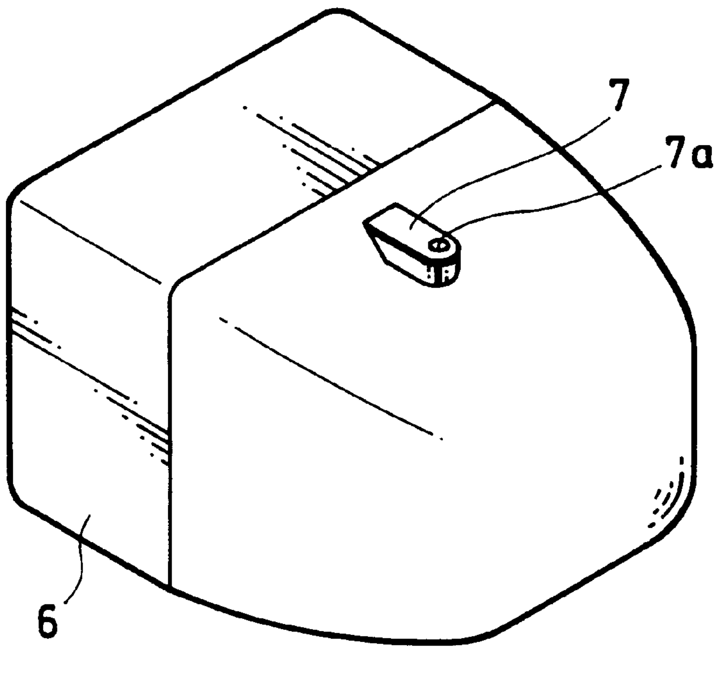
FIG. 2 is a perspective view of the rear portion of an example of a television receiver.

Initially, the antenna apparatus utilized with a holding apparatus according to the present invention is supposed to be similar to the indoor type television antenna apparatus shown in FIG. 1 of a mounting type which is arranged to be directly mounted on the television receiver 6, as shown in FIG. 2, for example.

As shown in FIG. 1, the antenna apparatus includes a substantially parallelepiped holding member 2 formed of a mold synthetic resin such as an ABS resin, for example, and a pair of rod antennas 1*a*, 1*b* having a predetermined length and capable of being expanded and contracted. The pair of rod antennas 1*a*, 1*b* are rotatably engaged at respective one ends with the holding member 2 by screws 3 so as to form any angle between the antennas extending in the left and right directions relative to each other.

The holding member 2 has a mounting shaft 4 which is integrally formed with the holding member 2 so as to have a predetermined length and project from the holding member 2 on a side opposite to a side on which the pair of rod antennas 1*a*, 1*b* are provided. This mounting shaft 4 is formed into a substantial cylindrical shape having a slit 4*a* of a predetermined length extending from the free end side of the mounting shaft 4. The mounting shaft 4 also has an expanding portion 4*b* formed along an outer periphery of the free end portion thereof.

Further, one end of a feeder line 5 is connected to the pair of rod antennas 1*a* and 1*b* while the other end of the feeder line 5 is connected to a predetermined portion of a television receiver 6.

Figure 3:
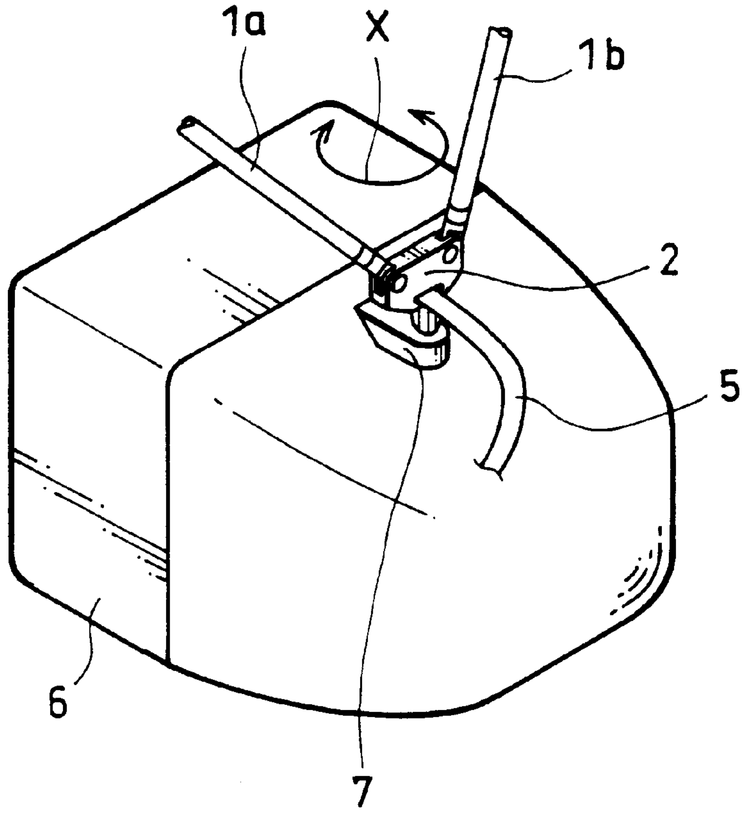
FIG. 3 is a perspective view showing the television receiver attached with the example of the indoor type television antenna apparatus.

If the antenna apparatus is mounted on the television receiver 6 provided with an antenna mounting portion 7, as shown in FIG. 3, similarly to the prior art, the mounting shaft 4 of the antenna apparatus is inserted at its free end into an antenna mounting hole 7*a* of the antenna mounting portion 7 to be fitted thereto. In this case, the slit 4*a* provided in the mounting shaft 4 enables the shaft 4 to be inserted and fitted into the mounting hole 7*a* with ease.

In this case, the expanding portion 4*b* formed at the free end of the mounting shaft 4 serves as a stopper, which prevents the mounting shaft 4 from being easily disengaged from the antenna mounting hole 7a1*a*. Further, since the mounting shaft 4 is formed into a cylindrical shape, the antenna apparatus can rotate with ease in the directions shown by the arrow X of FIG. 3. Therefore, the pair of rod antennas 1*a*, 1*b* can be adjusted in their orientation and position with ease.

Figure 4:
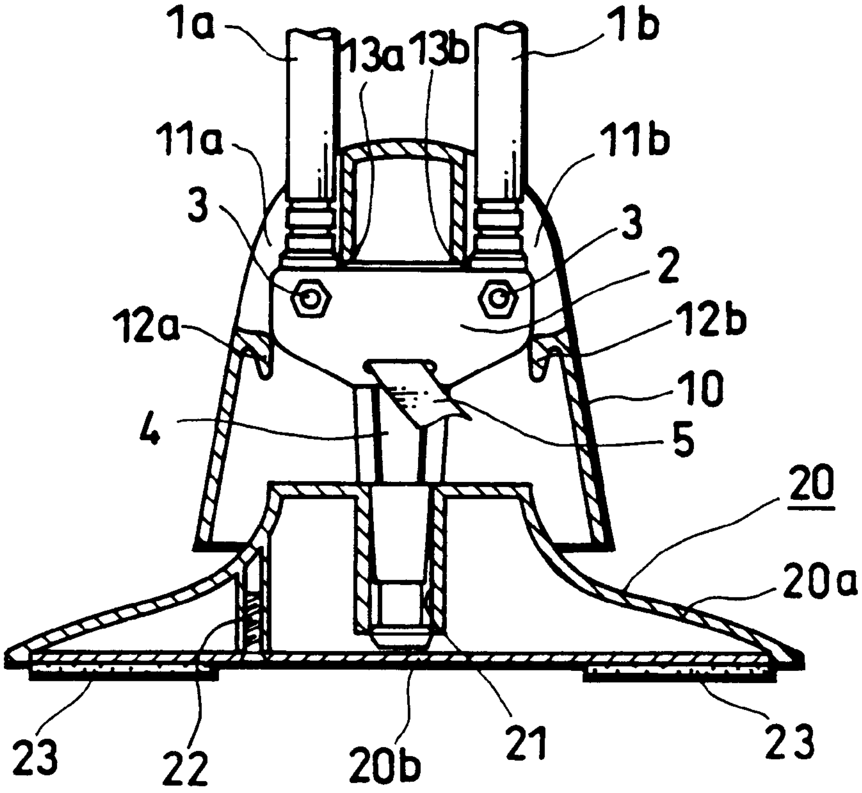
FIG. 4 is a is a cross-sectional view of one embodiment of a holding apparatus of an antenna apparatus according to the present invention.
Figure 5:
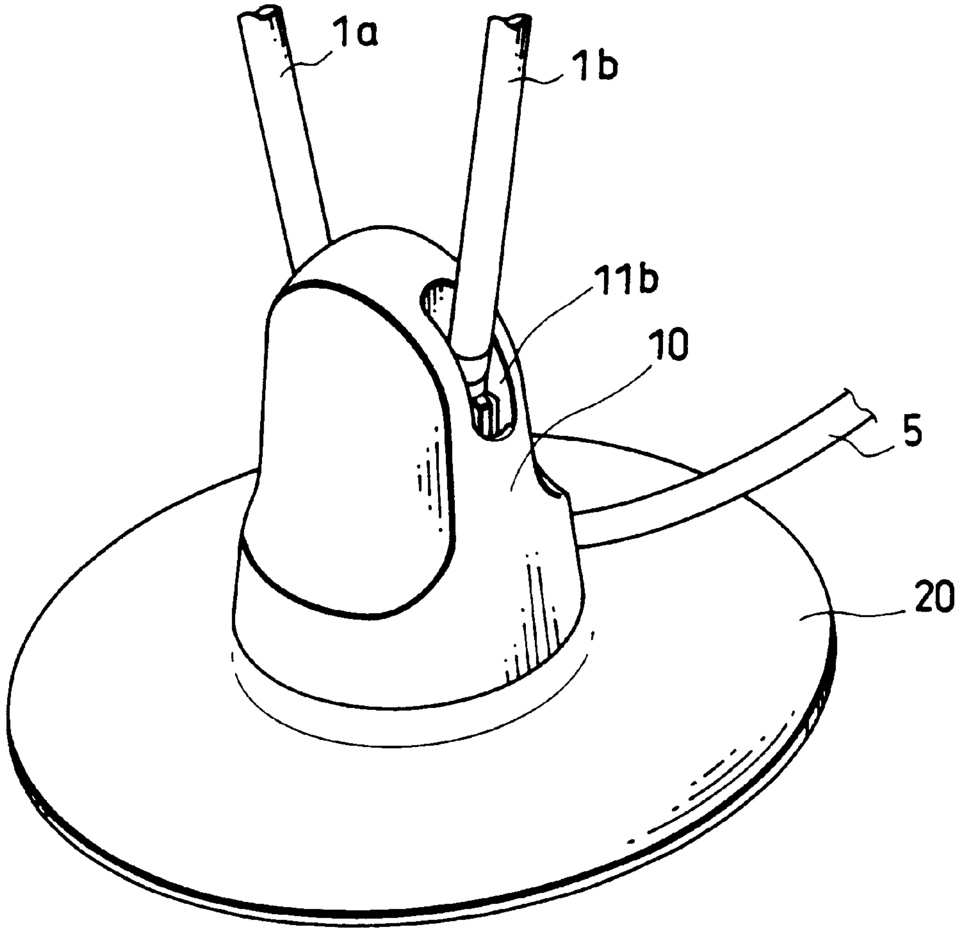
FIG. 5 is a perspective view of the one embodiment of the holding apparatus of the antenna apparatus according to the present invention.
Figure 6:
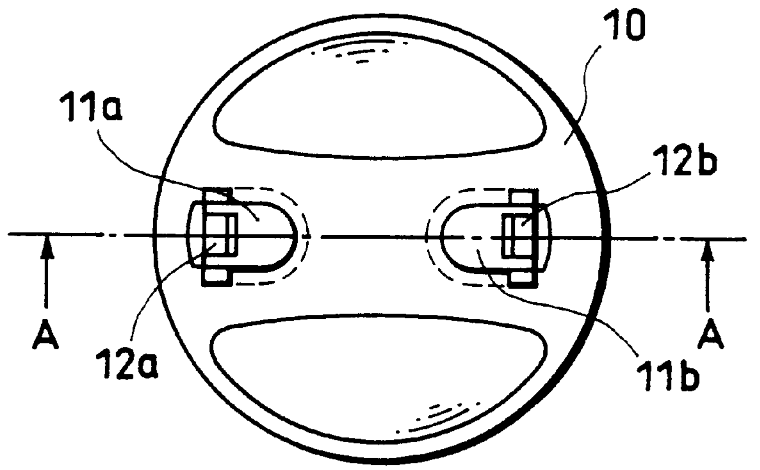
FIG. 6 is a plan view of an example of a top cover.

According to one example of the present invention, a holding apparatus as shown in FIGS. 4 through 10 is provided for the above-described antenna apparatus. The holding apparatus includes a top cover 10 and a stand base 20, as shown in FIGS. 4 and 5.

The top cover 10 is formed of a mold part of an ABS resin, for example, and its overall shape is substantially a temple bell shape as shown in FIGS. 4 through 8. The top cover 10 has at its upper side a pair of opening portions 11*a* and 11*b* formed so that a pair of rod antennas 1*a*, 1*b* of the antenna apparatus can pass therethrough when the antenna apparatus is attached to the holding apparatus. The opening portions 11*a*, 11*b* are formed to permit the rod antennas 1*a* and 1*b* to tilt within a range of a substantial right angle between the vertical direction and the horizontal direction.

Further, the top cover 10 has formed in its inside a clipping portion for clipping the substantially parallelepiped holding member 2 of the antenna apparatus. The clipping portion has a pair of hook-like resilient tabs 12*a* and 12*b* integrally formed on the inside of the top cover 10 and projecting at positions corresponding to the opening portions 11*a* and 11*b*. The clipping portion also has position regulating portions 13*a*, 13*b* disposed at upper portions of the pair of resilient tabs 12*a* and 12*b*.

In this case, the antenna apparatus is supported in such a manner that the position regulating portions 13*a*, 13*b* are brought to abut against the upper surface of the substantially parallelepiped holding member 2 of the antenna apparatus while the pair of resilient tabs 12*a* and 12*b* abut against the lower surface of the holding member to upwardly urge the same 2.

Further, in this case, since the resilient tabs 12*a* and 12*b* are formed at positions corresponding to the opening portions 11*a* and 11*b*, a structure of a die for molding the top cover by injection becomes simple.

Figure 7:
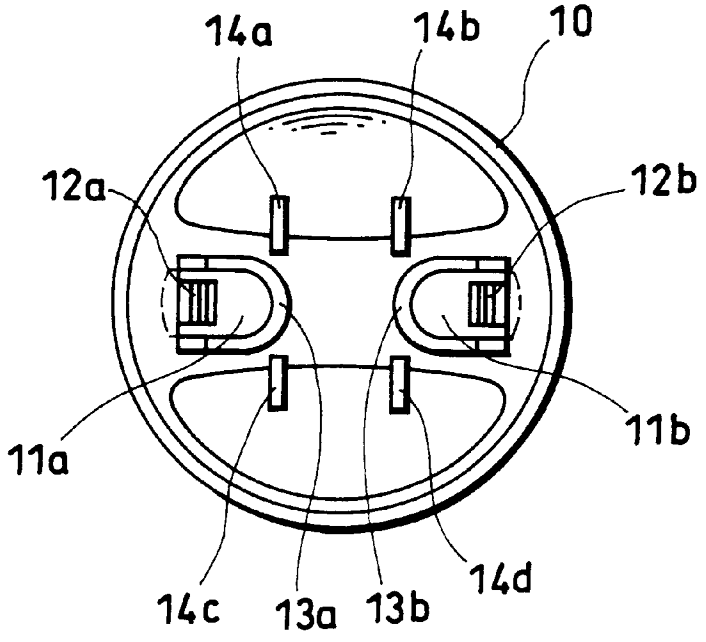
FIG. 7 is a bottom view of the example of the top cover.
Figure 8:
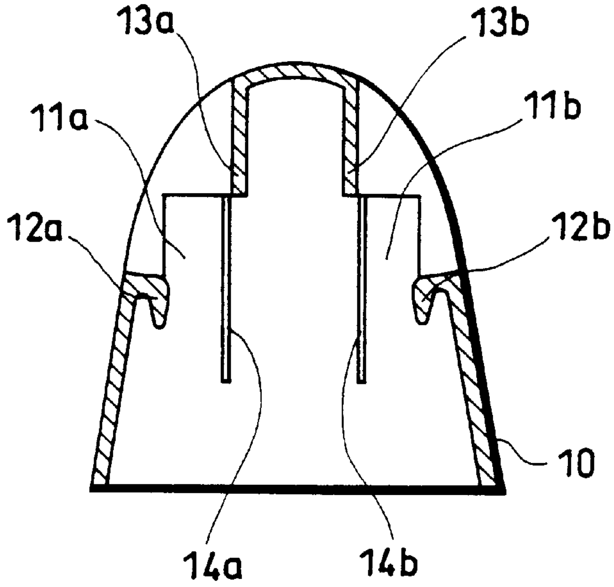
FIG. 8 is a cross-sectional view of the top cover taken along the line A—A in FIG. 6.

Further, as shown in FIGS. 7 and 8, the top cover 10 has on its inner side, ribs 14*a*, 14*b*, 14*c*, 14*d* formed for regulating and guiding both the sides of the holding member 2 of the antenna apparatus. Specifically, the top cover 10 has in its inner side, ribs 14*a*, 14*b* integrally formed in a parallel fashion and the ribs 14*c*, 14*d* also integrally formed in a parallel fashion in an opposing fashion between the resilient tabs 12*a*, 12*b* and the position regulating portions 13*a*, 13*b* so that these ribs guide the side surfaces of the holding member 2.

Further, as shown in FIGS. 4, 5, 9 and 10, the stand base 20 is composed of an upper plate 20*a* of a flared shape formed by molding an ABS resin, for example, and a bottom plate 20*b*. In this case, the height from the hem portion of the flare shaped portion to the central portion of the upper plate 20*a* is set larger than the length of the insertion portion of the mounting shaft 4 of the antenna apparatus.

Figure 9:
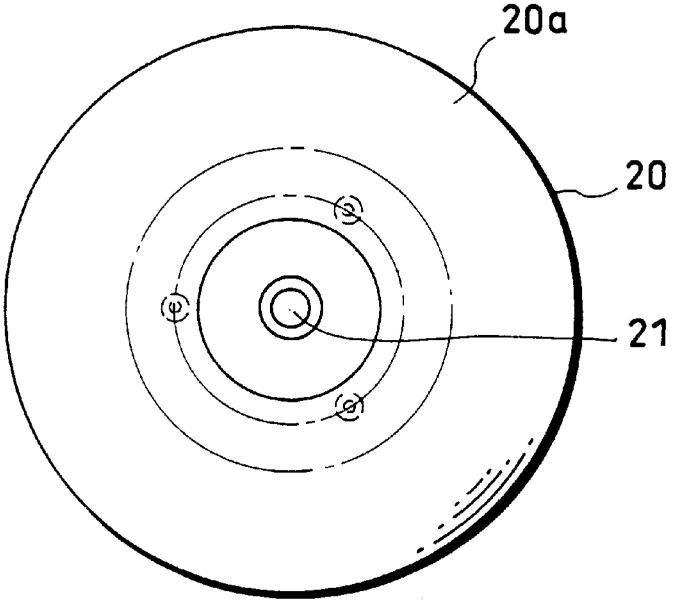
FIG. 9 is a plan view of an example of a stand base.

The upper plate 20*a* has at its central portion a mounting hole 21 of a predetermined depth as shown in FIGS. 4 and 9, so that the mounting shaft 4 of the antenna apparatus is inserted and fitted thereto.

Further the bottom plate 20*b* may be formed of a metal plate having a predetermined weight such as of iron or the like (so that it prevents the antenna apparatus from being toppled regardless of the angle of the rod antennas 1*a*, 1*b*). Then, the bottom plate 20*b* made of the metal plate is fixed to the upper plate 20*a* by means of screws 22.

Figure 10:
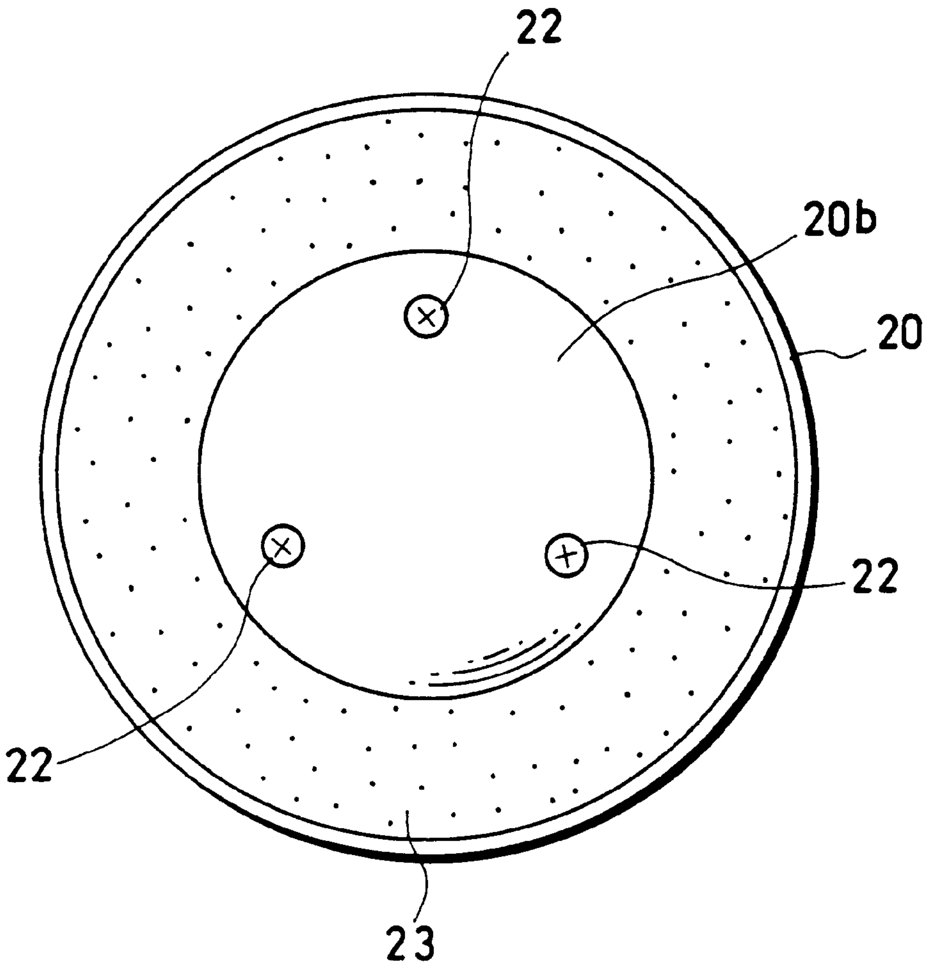
FIG. 10 is a bottom view of the example of the stand base.

In the present example, as shown in FIGS. 4 and 10, the bottom plate 20*b* has on the outer periphery of its bottom surface 20*b* a sheet-shaped cushion material 23 made of foamed neoprene rubber, a felt or the like, for example, attached so as to form a doughnut shape.

The holding apparatus of the antenna apparatus is constructed as described above. Therefore, when the top cover 10 is attached to the antenna apparatus, the pair of rod antennas 1*a* and 1*b* are made to stand substantially vertically as shown in FIG. 4 so that the rod antennas 1*a* and 1*b* pass through the top cover 10 from the opening side thereof at the opening portions 11*a* and 11*b* of the top cover 10, respectively. Thereafter, the antenna apparatus is fitted into the top cover at its holding member 2 so that the pair of resilient tabs 12*a*, 12*b* and the position regulating portions 13*a*, 13*b* sandwich the antenna apparatus at its holding member 2.

In this case, since the holding member 2 is guided and regulated at its side surfaces by the ribs 14*a*, 14*b*, 14*c*, 14*d* useful for guiding the holding member 2, the antenna apparatus can be comfortably sandwiched and fitted in the top cover 10.

When the antenna apparatus is mounted on the stand base 20, as shown in FIG. 4, the antenna apparatus is inserted at the mounting shaft 4 from its free end into the central mounting hole 21 of the stand base 20 to be fitted therein. In this case, the slit 4*a* formed at the free end of the mounting shaft 4 enables the mounting shaft 4 to be inserted and fitted thereinto with ease.

In this case, the expanding portion 4*b* formed at the free end of the mounting shaft 4 serves as a stopper so that the mounting shaft 4 is prevented from being easily disengaged from the mounting hole 21. Moreover, since the mounting shaft 4 is formed into a cylindrical shape, the antenna apparatus can be rotated relative to the stand base 20 with ease. Therefore, the pair of rod antennas 1*a* 1*b* can be adjusted in their orientation and position with ease.

Further, the present embodiment is arranged to provide a gap between the stand base 20 and the top cover 10 when the antenna apparatus is mounted on the stand base 20 and the antenna apparatus is attached with the top cover 10. Thus, the feeder line 5 can be passed through the gap.

At this time, the antenna apparatus can be rotated together with the top cover 10 relative to the stand base 20. Therefore, the pair of rod antennas 1*a*, 1*b* can be adjusted in their orientation and position satisfactorily.

According to the present embodiment, as shown in FIGS. 4 and 5, the antenna apparatus can be fitted at its mounting shaft 4 into the stand base 20 at its mounting hole 21 so that the antenna apparatus can be utilized as an on-the-table antenna apparatus.

Moreover, according to the present embodiment, the holding member 2 of the pair of rod antennas 1*a*, 1*b* of the antenna apparatus is covered with the top cover 10 so that the antenna apparatus presents an excellent appearance when the antenna apparatus is utilized as the on-the-table antenna apparatus.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A holding apparatus for holding an antenna that includes a pair of rod antennas, a holding member for holding the pair of rod antennas, and a mounting shaft having a free end projecting away from the holding member in a direction opposite to which the pair of rod antennas are provided and having an expanding portion formed at the free end, said holding apparatus comprising:

a top cover being substantially bell shaped and including an opening portion through which a pair of rod antennas can pass and a clipping portion clipping a holding member of an antenna; and a base stand having an upper plate formed into a flared shape and including a mounting hole formed at a central portion of said upper plate into which a mounting shaft of an antenna rotatably fits with a flat surface surrounding said mounting hole, wherein said mounting hole has a predetermined length so that when the mounting shaft is inserted an expanding Portion of the mounting shaft extends beyond the mounting hole and a portion of the mounting shaft adjacent the holding member of an antenna abuts said flat surface surrounding said mounting hole and a height from a hem portion of said flared shaped upper plate to the central portion of said base stand is set to be larger than an insertion portion of the mounting shaft of the antenna.

2. The holding apparatus for holding an antenna according to claim 1, wherein said top cover is formed of a molded synthetic resin.

3. The holding apparatus for holding an antenna according to claim 1, wherein said clipping portion of said top cover is composed of a pair of resilient tabs, wherein position regulating portions are provided at respective upper portions of said pair of resilient tabs.

4. The holding apparatus for holding an antenna according to claim 3, wherein said resilient tabs are formed at a position corresponding to said opening portion of said top cover.

5. The holding apparatus for holding an antenna according to claim 3, wherein said top cover has on an inner surface a guide portion for guiding a holding member of an antenna between said resilient tabs and said position regulating portions.

6. The holding apparatus for holding an antenna according to claim 1, wherein said base stand is composed of said upper plate formed into a flared shape and made of a molded synthetic resin part and a bottom plate.

7. The holding apparatus for holding an antenna according to claim 6, wherein said bottom plate is made of a metal.

8. The holding apparatus for holding an antenna according to claim 6, wherein said base stand has attached on an outer peripheral side of a bottom surface a sheet of cushion material formed into a doughnut shape.

9. The holding apparatus for holding an antenna according to claim 1, wherein an annular gap is formed between a bottom edge of said top cover and said hem portion of said flared shaped upper plate of said base stand so that a feeder line connected to a pair of rod antennas of an antenna can pass therethrough.

10. The holding apparatus for holding an antenna according to claim 1, wherein said top cover and a pair of rod antennas of an antenna are freely rotatable with respect to said base stand.

* * * * *